United States Patent [19]

Knoll et al.

[11] Patent Number: 5,006,134
[45] Date of Patent: Apr. 9, 1991

[54] COAGULATOR FOR SYSTEMS FOR THE PURIFYING OF EXHAUST GASES OF FOSSIL FUELS

[75] Inventors: Guenter Knoll, Stuttgart; Rolf Leonhard, Schwieberdingen; Wolfgang Kraft, Leonberg-Ramtel; Bernhard Lucas, Weissach, all of Feb. Rep. of Germany

[73] Assignee: Robert Bosch GmbH, Stuttgart, Fed. Rep. of Germany

[21] Appl. No.: 455,410

[22] PCT Filed: May 20, 1989

[86] PCT No.: PCT/DE89/00320
§ 371 Date: Dec. 15, 1989
§ 102(e) Date: Dec. 15, 1989

[87] PCT Pub. No.: WO89/12731
PCT Pub. Date: Dec. 28, 1989

[30] Foreign Application Priority Data

Jun. 18, 1988 [DE] Fed. Rep. of Germany ....... 3820740

[51] Int. Cl.⁵ .................................................. B03C 3/00
[52] U.S. Cl. .......................................... 55/146; 55/135
[58] Field of Search ................... 55/135, 146; 60/275

[56] References Cited

U.S. PATENT DOCUMENTS 4,618,351 10/1986 Esper et al. .......................... 55/146

FOREIGN PATENT DOCUMENTS 3305601 8/1984 Fed. Rep. of Germany .

Primary Examiner—Bernard Nozick
Attorney, Agent, or Firm—Michael J. Striker

[57] ABSTRACT

In a coagulator for systems for the purifying of exhaust gases of fossil fuels, in particular of exhaust gases from diesel internal-combustion engines, which has a housing (10), poled as counter-electrode, an electrode (11) arranged concentrically in the housing (10) and at high volotage and an electrically heatable insulator (13) for the insulated leading of the electrode (11) through the housing (10), the insulator (13) is designed in two parts for achieving a great high voltage resistance with relatively small overall dimensions and consists of a ceramic inner tube (17) and a ceramic protective tube (18) surrounding the latter. The heating conductor track (19) required for heating is applied in the shape of a coil as a thick-film conductor to the circumference of the inner tube (17) and the protective tube (18) is sintered on to the inner tube (17) in such a way that the parting line (14) between inner and protective tube (17, 18) is gastight (FIG. 1).

17 Claims, 4 Drawing Sheets

COAGULATOR FOR SYSTEMS FOR THE PURIFYING OF EXHAUST GASES OF FOSSIL FUELS

PRIOR ART

The invention relates to a coagulator for systems for the purifying of exhaust gases of fossil fuels, in particular of exhaust gases from diesel internal-combustion engines.

In the case of such coagulators, also known as agglomerators or electrostatic soot separators, the particles contained in the exhaust gases, for example soot particles, are ionised in the electrostatic field developing between the electrode and the housing poled as counter-electrode. This involves the particles taking on electric charges, so that the particles coagulate, i.e. attract one another and join together to form sizeable agglomerates, which can be deposited more easily in downstream centrifugal separators, so-called cyclones.

A part of the agglomerates thus formed is already deposited in the coagulator. With time, deposits of electrically conductive agglomerates also occur in this way on the insulator ensuring the insulated leading of the electrode through the housing, which agglomerates would lead to short-circuiting of the insulator and consequently to the failure of the coagulator. In order to avoid this, it is necessary to heat the surface of the insulator in an annular region constantly to a temperature of over 400° C. by means of an electric heating conductor track in the insulator. At this temperature, the depositing of agglomerates on the insulator is prevented. An agglomerate deposition which has formed after switching-off of the coagulator can be burned off, i.e. oxidised, by heating the insulator up to over 600° C.

In the case of a known coagulator of the type mentioned at the beginning (DE 33 05 601 A1), an annular incandescent zone is produced on the surface of the insulator by means of the thick-film heating conductor track arranged underneath a top layer. This incandescent zone lies at the end of the insulator directly at the outlet point of the electrode from the insulator. This annular section must in this case be sufficiently far away from the electrode, i.e. the insulator must have a sufficiently great diameter, which must be at least 60 mm in the case of a high voltage of about 17 kV. With such a dimension of the insulator, considerable heat output is required due to the relatively large surface of the incandescent zone. In addition, with such a dimension of the insulator, the thermal stresses lead to crack formations and destructions. In addition, it is necessary to make the top layer for the heating conductor track resistant to high voltages, as a result of which the latter has to be dimensioned approximately the same as the insulator itself. In this case, an unavoidable parting line forms between the base material and the top layer of the insulator, which parting line does not achieve the dielectric strength of the base material. Disruptive discharges at the sides between a top layer and base material are therefore unavoidable.

ADVANTAGES OF THE INVENTION

The coagulator according to the invention has in comparison the advantage that the insulator only requires a relatively small outside diameter and consequently problems associated with thermal stresses do not occur. At a high voltage of about 17 kV, the insulator requires an outside diameter of only 18 mm for the certain avoidance of disruptive discharges. Due to the sintered-on protective tube, the heater winding is sufficiently far away from the parts carrying high voltage. The protective tube itself is resistant to high voltage, the parting line is gas-tight, so that no disruptive discharges can occur here either.

Advantageous further developments and improvements of the coagulator specified in claim 1 are possible by the measures given in the further claims.

DRAWING

The invention is described in more detail below with reference to exemplary embodiments represented in the drawing, in which:

FIGS. 1 to 3 show in a cutaway form in each case a longitudinal section of a coagulator for an exhaust gas purification system of diesel engines according to a first, second and third exemplary embodiment, FIG. 4 shows a longitudinal section of an insulator according to a further exemplary embodiment for use in the coagulators according to FIGS. 1-3.

DESCRIPTION OF THE EXEMPLARY EMBODIMENTS

Figure 1:
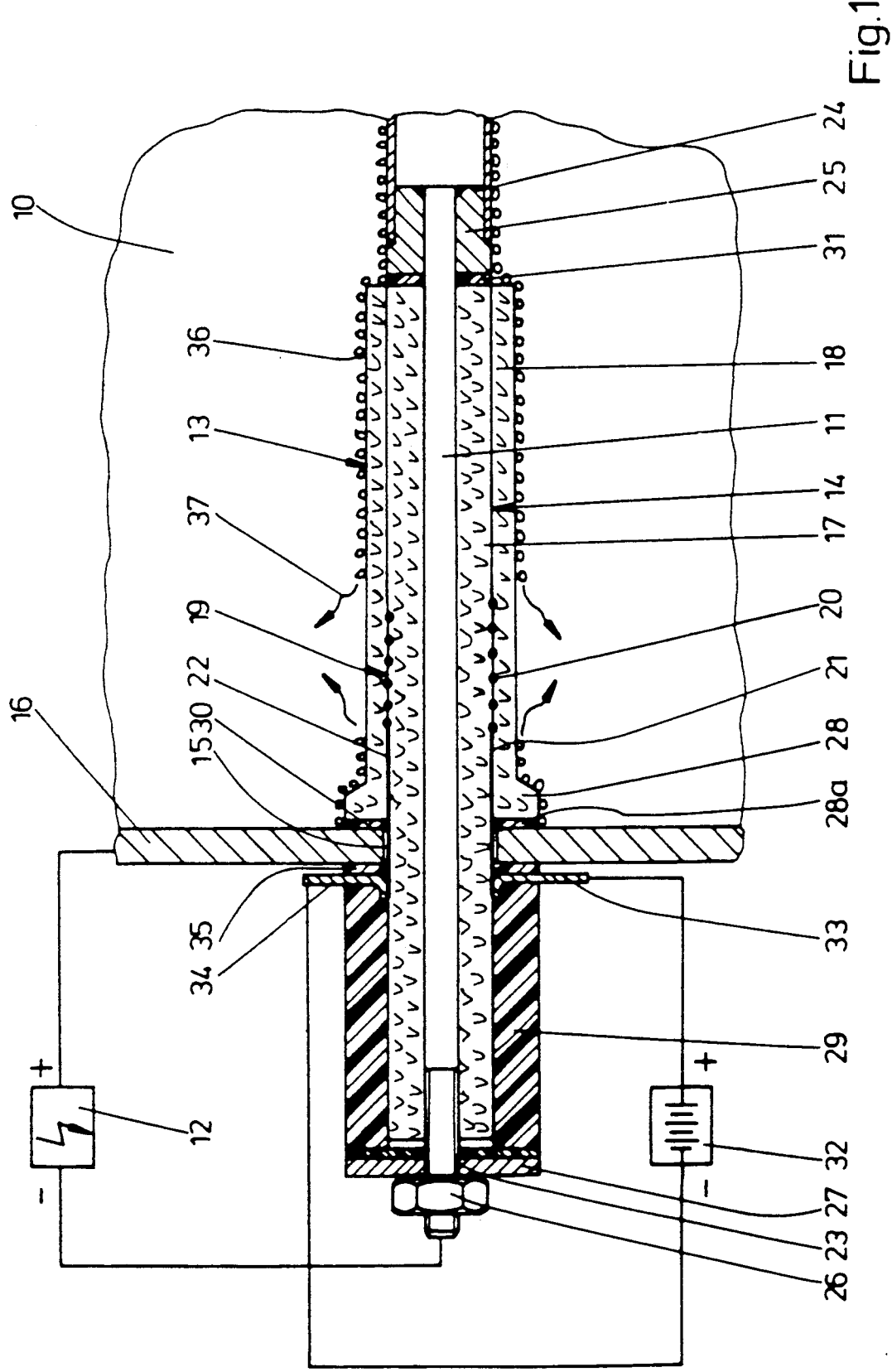

The coagulator, to be seen in a cutaway form in longitudinal section in FIG. 1 has a cylindrical housing 10 and an electrode 11, arranged concentrically in the housing 10. The electrode 11 lies at the positive pole of a high-voltage source 12, of for example 17 kV, while the housing 10 is earthed and consequently forms the counter-electrode. The electrode 11 is held centred by means of two insulators 13 in the housing 10. In FIG. 1, only the left-hand part of the coagulator is shown and consequently only one insulator 13 can be seen. However, the coagulator is mirror-symmetrically designed, so the electrode 11 is held at both ends in the same way, in an insulator 13 in each case. However, it is also possible to design the electrode 11 as a cantilever electrode, which is then held on one side by only one insulator 13. The insulator 13 receives the electrode 11 centrally over a certain section of length and is held in a grommet 15 in a housing wall 16 of the housing 10 braced against the latter.

The insulator 13 is designed in two parts and consists of an inner tube 17 receiving the electrode 11 and of a protective tube 18 surrounding the latter. Both tubes 17, 18 are made of temperature-resistant insulating materials, for example of aluminium-oxide or glass ceramic. An electric heating conductor track 19, which is designed as a thick-film heating conductor track and consists of metals of the tungsten or platinum group, is applied to the circumference of the inner tube.

This heating conductor track 19 is made up of the actual heating coil 20, which surrounds the inner tube 17 over a section of its length and two leads 21, 22, which are laid axially over the surface of the inner tube 17. If platinum is used as the material of the heating conductor track, an automatic controlling effect is produced on account of the PTC behaviour of platinum. The ohmic resistance of the heating conductor track 19 then increases approximately linearly with the temperature, so that the heating output is reduced with increasing resistance. If the insulator 13 is heated by hot exhaust gases, the heating output consequently drops. The ceramic protective tube 18 is sintered on to the inner tube 17, provided with the heating conductor track 19, to be precise in such a way that the parting gap 14 between the inner tube 17 and protective tube 18 is gas-tight. For fastening the electrode 11 in the insulator 13, the electrode 11 has on its free front end an external thread 23 and, at a distance from the free front end, increases in diameter, so that an annular shoulder 24 is produced here. From the free front end of the electrode 11, the insulator 13 is pushed on to the latter and bears with the free front end of the inner tube 17 against the annular shoulder 24, with an adaptor 25 interposed. The insulator 13 is braced between the annular shoulder 24 and a tightening disc 27 placed on the opposite front end of the insulator 13 by means of a tightening nut 26 screwed on to the external thread 23. The heating coil 20 of the heating conductor track 19 has in this case such a minimum distance from the free end of the insulator 13 facing the annular shoulder 24 that disruptive discharges along the parting line 14 are prevented with certainty. With a high voltage of 17 kV, this minimum distance is about 25 mm.

The protective tube 18 can extend only over a part of the length of the inner tube 17 and bears a front flange 28 on its end remote from the free end of the insulator 13. The protective tube 18 bears with this front flange 28 against the housing wall 16 containing the grommet 15, while the inner tube 17 projects outwards through the grommet 15. An insulating sleeve 29, which reaches up to the housing wall 16, is pushed on to this projecting inner tube section from the outside. The tightening disc 27 is designed so large in diameter that it also covers the front annular surface of the insulating sleeve 29, so that the insulating sleeve 29 is at the same time braced against the housing wall 16 by the tightening nut 26. In this arrangement, the front surface 28a of the front flange 28 is placed against the opposite side of the housing wall 16, so that the insulator 13 is held with electrode 11 firmly in the housing. Between the front surface 28a of the front flange 28 and the housing wall 16 on the one hand and the free front end of the protective tube 18 and the adaptor 25 on the other hand there is arranged in each case a disc-shaped seal 30, 31, which serve for the gas-tight leading of the electrode 11 through the housing wall 16. For the connection of the heating conductor track 19 to a power source 32, which may be formed for example by the motor vehicle battery, two contact tongues 33, 34 are clamped against the housing wall 16 during bracing of the insulating sleeve 29, which tongues are insulated from the earthed housing wall 16 by an insulating disc 35. Each contact tongue 33, 34 contacts one of the two leads 21, 22 of the heating conductor track 19, which are led out via the front flange 28 of the protective tube 18 on the surface of the inner tube 17, and is connected to one of the poles of the power source 32.

The housing 10 also has two openings (not shown here) for the supply and discharge of the exhaust gas. The exhaust gas flows through the inside of the housing 10, an electrostatic induction charge being impressed in a known way on the soot particles or soot droplets due to the homogenous electric field generated between the electrode 11 and the housing 10 acting as counter-electrode. The charged soot particles coagulate to form sizeable agglomerates. A small percentage of these agglomerates is already deposited in the coagulator, to be precise also on the electrode 11 and the insulator 13. This is shown diagrammatically in FIG. 1, the agglomerate deposition being denoted by 36. In the region of the heating conductor track 19, the deposition of agglomerates is prevented by the surface temperature prevailing there, since soot sublimates at the temperature prevailing in this zone. If soot has deposited in this region as well after switching-off of the heating, this deposit is burned off after switching on of the heating. As soon as an annular zone has been burned free of soot over the heating coil 20, an arc, shown symbolically in FIG. 1 by 37 ignites, assists further burning-free and, in dependence of the overall length of the insulator 13, produces a soot-free zone, which extends far beyond the width of the heating coil 20 and is sufficient for the insulation of the high voltage applied.

In wide ranges of operation of a diesel engine, the soot removal by the burning arcs 37 is sufficient, without the high-voltage output used up for this becoming too great. The heated insulator 13 shown can therefore also be used in intermittent operation. In this case, a threshold switch (not shown) with hysteresis is used, which switches on the heating when the high voltage drops below a critical level, switches off the heating again when the high voltage increases. The wall thickness of the protective tube 18 is dimensioned sufficiently strong for high-voltage disruptive discharges between the agglomerate deposition 36 and the heating coil 20 to be ruled out with certainty.

Figure 2:
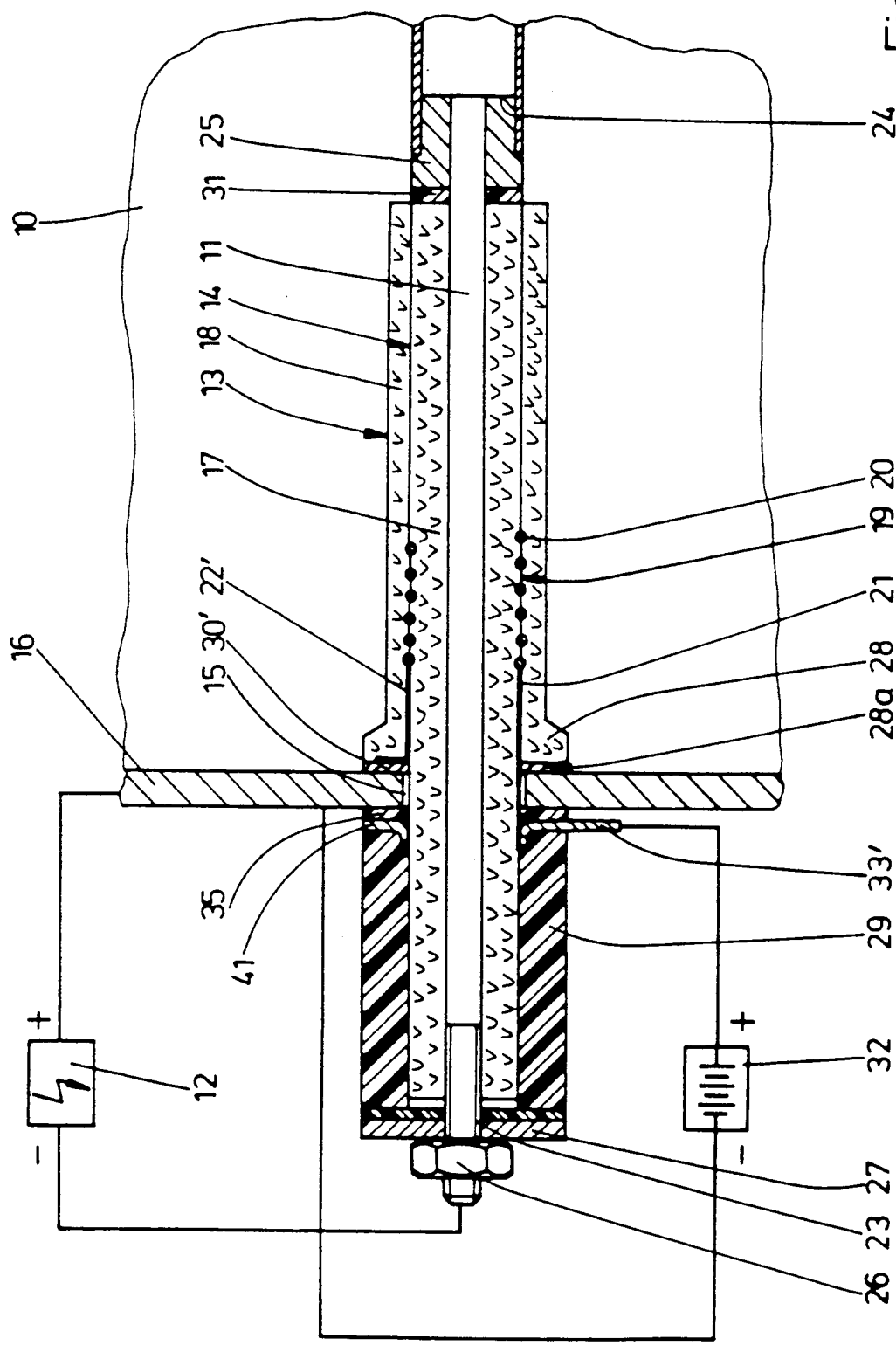

In comparison with the coagulator described above, the coagulator shown in longitudinal section in FIG. 2 is only modified with regard to the feeding of the electric heating output from the heating source 32 to the heating conductor track 19. In the case of this design of the coagulator, only the one lead 21 is led through the grommet 15 up to the contact tongue 33', here in one piece with a contact ring 41. The other lead 22' of the heating conductor track 19 runs on the surface of the inner tube 17 up to the front flange 28 of the protective tube 18 and is drawn up on the front surface 28a of the latter. The housing wall 16 is connected to the earth pole of the power source 32. The seal 30' between the front flange 28 and the housing wall 16 is of electrically conducting material, for example copper or graphite. Otherwise, the coagulator shown in FIG. 2 coincides with that in FIG. 1, so the same components are provided with the same reference numerals.

Figure 3:
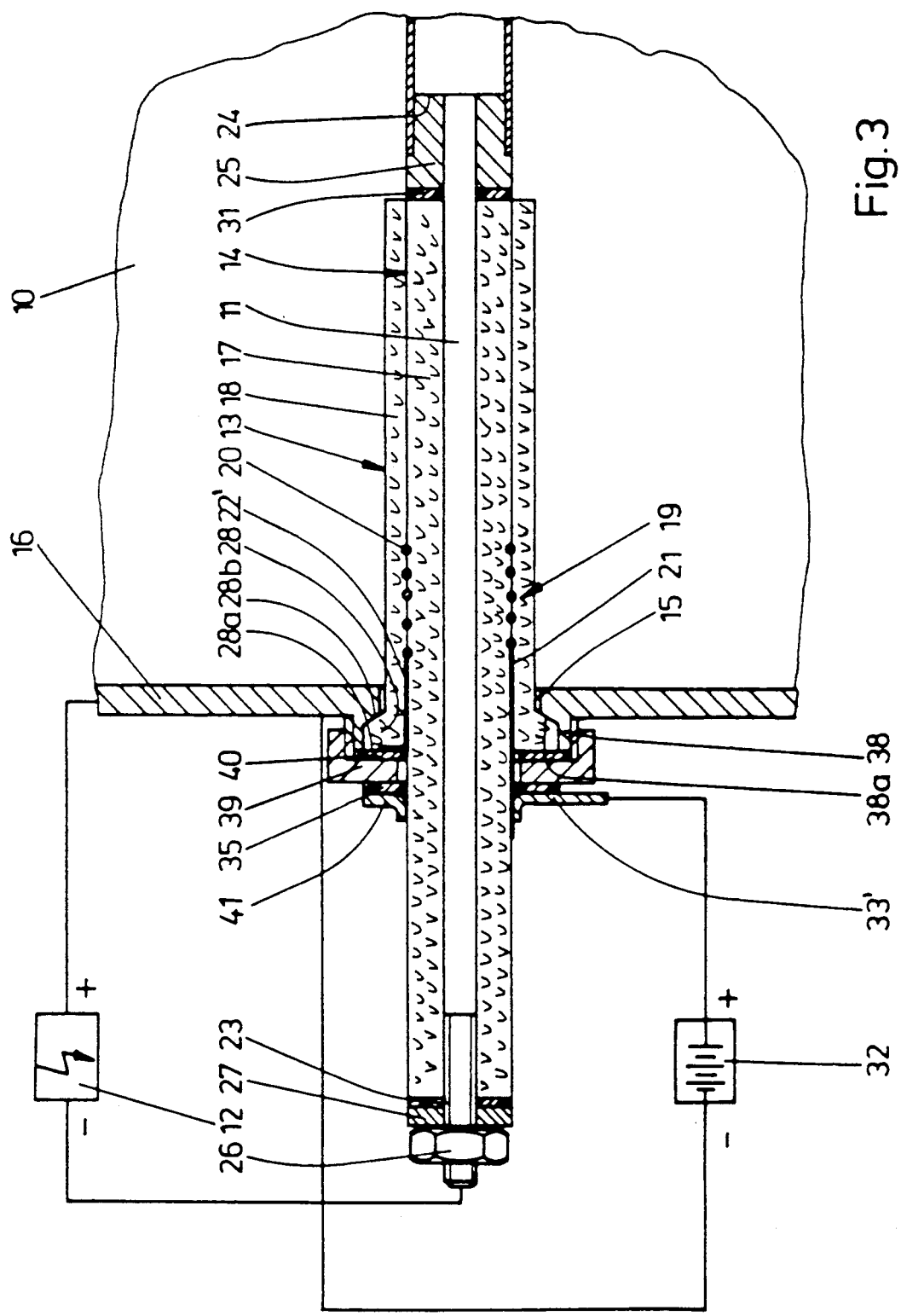

The third exemplary embodiment of a coagulator, shown in FIG. 3, is modified with regard to the fastening of the insulator 13 in the grommet 15 of the housing wall 16. The housing wall 16 bears a hollow-cylindrical one-piece threaded neck 38, which is coaxial with the grommet 15 and the inside diameter of which is greater than the outside diameter of the front flange 28 of the protective tube 18. At the base of the threaded neck 38, its inner wall 38a tapers conically up to the outer rim of the cylindrical grommet 15. The rear annular surface 28b of the front flange 28, remote from the free front surface 28a, likewise runs conically, corresponding to the conical taper of the inner wall 38a of the threaded neck 38, so that the insulator 13, inserted through the grommet 15 with its end remote from the front flange 28, bears positively against the inside wall 38a of the threaded neck 38 over the annular surface 28b of the front flange 28. In this position, the insulator 13 is braced inside the threaded neck 38 by means of a union nut 39, screwed on to the threaded neck 38. In this arrangement, between the union nut 39 and the front surface 28a of the front flange 28 there is also a spring washer 40, which is necessary for the compensation of the different thermal expansions. The leads 21 and 22' for the heating coil 20 of the heating conductor track 19 are designed identically as in FIG. 2. The housing wall 16 is again connected to the earth pole of the power source 32. The electric contact between the lead 22', drawn upon on the front surface 28a and the housing wall 16 is established via the threaded neck 38, the union nut 39 and the spring washer 40. The contact tongue 33' for the connection of the positive pole of the power source 32 is again seated in one piece on a contact ring 41, which is fastened to the union nut 39 with an insulating disc 35 interposed and, after screwing of the union nut 39 on to the threaded neck 38, contacts the lead 21. In the case of this design of the coagulator, a seal between front flange 28 of the protective tube 18 and the housing wall 16, as provided in FIGS. 1 and 2 and denoted by 30 and 30', respectively, can be dispensed with. All the other components coincide with those in FIGS. 1 and 2, so here again the same components are provided with the same reference numerals.

Figure 4:
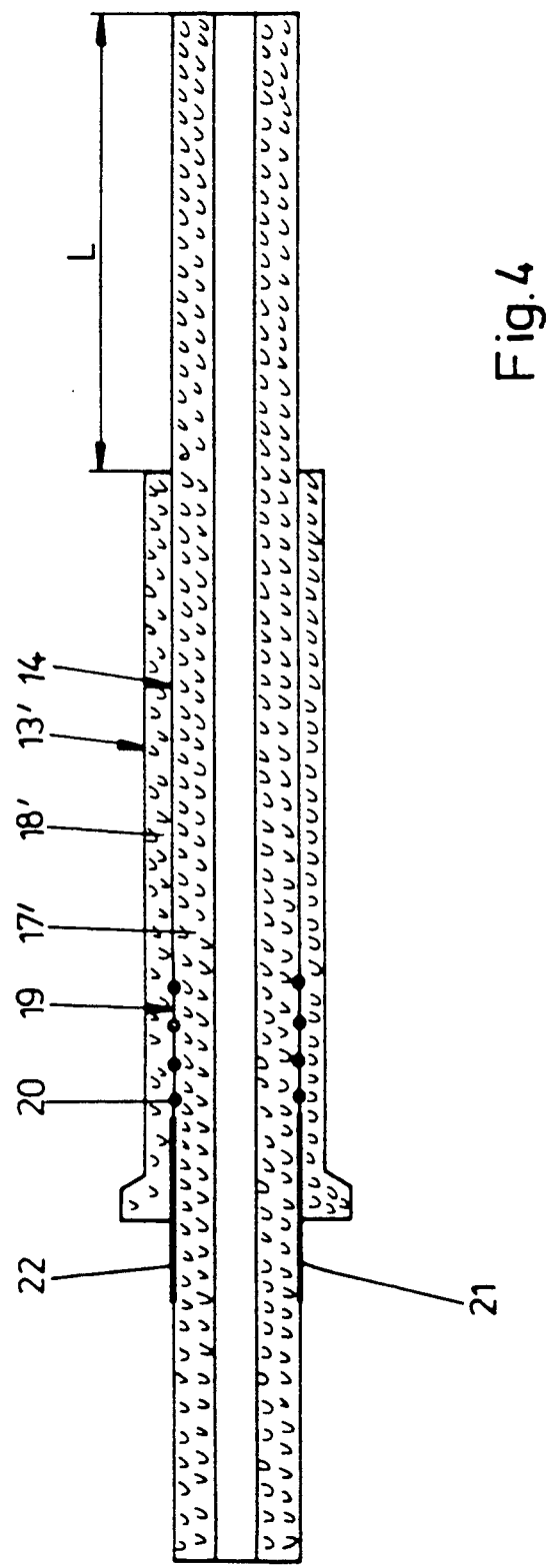

In the case of the insulator 13' shown in longitudinal section in FIG. 4, which can be used instead of the insulators 13 in each of the coagulators according to FIGS. 1, 2 or 3, inner tube 17' and protective tube 18' do not end flush inside the housing 10, instead the end of the protective tube 18' lies at a distance in front of the end of the inner tube 17' bearing against the shoulder 24 of the electrode 11 via the adaptor 25. The length of the distance L depends on the high voltage applied and must be about 1.5 mm per 1 kV. This increase in the overall length of the insulator 13 brings about an improved prevention of creep-flashovers and increases the overall distance which can be burned free by the interaction of heating and arcs. The high-voltage resistance of the insulator 13' is consequently increased.

We claim:

1. Coagulator for systems for purifying the exhaust gases of fossil fuels from diesel internal-combustion engines, with a housing, poled as counter-electrode and cylindrical electrode, arranged concentrically in the housing and at high voltage, and with at least one insulator surround the electrode over a section of its length for the insulated leading of the electrode through the housing, which insulator bears an electric heating conductor track for the prevention or elimination of an agglomerate deposit on its surface, wherein the insulator (13; 13') is in two parts and consists of a ceramic inner tube (17; 17') and a ceramic projective tube (18; 18'), surrounding the latter, the heating conductor track (19) is applied to the circumference of the inner tube (17; 17') and the protective tube (18; 18') is sintered on to the inner tube (17; 17') in such a way that the parting line (14) between inner and protective tubes (17, 18; 17', 18') is gas-tight.

2. Coagulator according to claim 1, wherein said inner and protective tubes (17, 18; 17', 18') consist of one of aluminium-oxide and glass ceramic.

3. Coagulator according to claim 1, wherein the heating conductor track (19) is designed as a thick-film conductor of one of platinum and tungsten with a heating coil (20), running around the inner tube (17; 17') over a section of its length, and two leads (21, 22; 22').

4. Coagulator according to claim 1, wherein another lead (22) on the surface of the inner tube (17) is led beyond the front flange (28) of the protective tube (18) up to an earthed power terminal (34), and each power terminal is formed by a contact tongue (33, 34), which is clamped between an insulating sleeve (29) and the housing wall (16) containing the housing grommet (15), with an insulating disc (35) interposed, and contacts an assigned lead (21, 22) (FIG. 1).

5. Coagulator according to claim 1, wherein the inner tube (17) bears indirectly or directly at its free front end, via an adapter (25), against a radial annular shoulder (24) of the electrode (11) and is braced against the latter via a tightening nut (26) screwed on to the electrode (11).

6. Coagulator according to claim 5, wherein between the front flange (28) of the protective tube (18) and the housing wall (16) containing the housing grommet (15), on the one hand, and on the free front end of the inner tube (17) supported by the electrode, on the other hand, there is arranged in each case a disc-shaped seal (30, 31).

7. Coagulator according to claim 1, wherein the protective tube (18) extends only over a part of the length of the inner tube (17) and bears a front flange (28) at one end, the inner tube (17) protrudes through a housing grommet (15) and the front flange (28) bears against a housing wall (16) containing a housing grommet (15) and is braced against the latter by a tightening nut (26) which can be screwed on one of the electrode (11) and the housing wall (16).

8. Coagulator according to claim 7, wherein an insulating sleeve (29), reaching up to the housing wall (16) containing the housing grommet (15), is pushed on to an inner tube section projecting through the housing grommet (16) out of the housing (10), which insulating sleeve is braced against the housing wall (16) via a tightening disc (27), resting on a front face thereof, and a tightening nut (26), screwed on to the electrode (11).

9. Coagulator according to claim 7, wherein a rear annular surface (28b), remote from the front surface (28a), of the front flange (28) of the protective tube (18) runs conically, the housing wall (16) containing the housing grommet (15) bears a hollow-cylindrical threaded neck (38), which surrounds the housing grommet (15), is preferably in one piece with it, has a greater inside diameter than the outer circumference of the front flange (28) and the inside wall (38a) of which tapers conically towards the housing grommet (15), corresponding to the conical course of the annular surface (28b) of the front flange (28), and the front flange (28) bears with its conical annular surface (28b) against a conical taper (38a) in the threaded neck (28) and is braced against the latter by means of a union nut (39) screwed on to the threaded neck (38) with a spring washer (40) interposed (FIG. 3).

10. Coagulator according to claim 9, wherein a disc-shaped seal (31) is arranged on the free front end of the inner tube (17) supported by the electrode (FIG. 3).

11. Coagulator according to claim 9, wherein the other lead (22') of the heating conductor track (19) runs on the surface of the inner tube (17) up to the front flange (28) of the protective tube (18) and is drawn up on the free front surface (28a) of the latter, the housing (10) is connected to the earth pole of the power source (32), and the power terminal for the lead (21) running beyond the front flange is formed by a contact ring (41), which is fastened to the union nut (39), with an insulating disc (35) interposed, and contacts the lead (21) (FIG. 3).

12. Coagulator according to claim 7, wherein a heating coil (20) is arranged with a minimum distance, preventing disruptive discharges via the parting line (14), from a free front end of the protective tube (18) remote from the front flange (28), and at least one of the leads (21) on a surface of the inner tube (17) is led beyond the front flange (28) up to a power terminal (33), which is connected to a pole of a power source (32) of a motor vehicle battery.

13. Coagulator according to claim 12, wherein the other lead (22') of the heating conductor track (19) runs on the surface of the inner tube (17) up to the front flange (28) of the protective tube (18) and is drawn up on the front surface (28a) of the latter, the housing wall (16) is connected to the earth pole of the power source (32), and the power terminal for the lead (21) running beyond the front flange (28) is formed by a contact ring (41) with a contact tongue (33'), which is held between the insulating sleeve (29) and the housing wall (16), with an insulating disc (35) interposed, and contacts the lead (21). (FIG. 2).

14. Coagulator according to claim 13, wherein between the front flange (28) of the protective tube (18) and the housing wall (16) containing the housing grommet (15), on the one hand, and on the free front end of the inner tube (17) supported by the electrode, on the other hand, there is arranged in each case a disc-shaped seal (30', 31), and the first-mentioned seal (30') consists of one of copper and graphite.

15. Coagulator according to claim 1, wherein an end of the protective tube (18) remote from the front flange (28) terminates flush with the free end of the inner tube (17) supported by the electrode.

16. Coagulator according to claim 15, wherein the end of the protective tube (18') remote from the front flange (28) lies at a distance (L) in front of the end of the inner tube (17') supported by the electrode (FIG. 4).

17. Coagulator according to claim 16, wherein the distance (L) between the ends of inner and protective tubes (17', 18') is about 1.5 mm per 1 kV of the high voltage prevailing between the electrode (11) and the housing (10).

* * * * *